US006732034B2

United States Patent
Hambsch et al.

(10) Patent No.: US 6,732,034 B2
(45) Date of Patent: May 4, 2004

(54) METHOD FOR CLASSIFYING A ROLLOVER EVENT OF A VEHICLE

(75) Inventors: Katja Hambsch, Rettigheim (DE); Michael Roelleke, Leonberg-Hoefingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/072,845

(22) Filed: Feb. 6, 2002

(65) Prior Publication Data
US 2002/0120380 A1 Aug. 29, 2002

(30) Foreign Application Priority Data
Feb. 10, 2001 (DE) .......................... 101 06 181

(51) Int. Cl.[7] .......................... B06R 22/00; E05F 15/00; G05D 1/00; G05D 3/00; G06F 17/00
(52) U.S. Cl. .............................. 701/45; 701/36; 701/37; 701/38; 701/46; 701/47; 701/213; 701/301; 180/282; 280/734; 280/735; 702/183; 340/438; 340/440; 342/357.07; 455/404.2; 455/457; 379/39
(58) Field of Search ...................... 701/36–38, 45–47, 701/1, 213, 301, 117, 39; 180/282; 280/734, 735; 702/183; 340/438, 440; 342/357.07; 455/404.2, 457; 379/39

(56) References Cited

U.S. PATENT DOCUMENTS

| 6,073,004 A | * | 6/2000 | Balachandran | 455/404.2 |
| 6,157,295 A | * | 12/2000 | Steiner et al. | 340/440 |
| 6,292,759 B1 | * | 9/2001 | Schiffmann | 701/36 |
| 6,315,074 B1 | * | 11/2001 | Achhammer et al. | 180/282 |
| 6,397,133 B1 | * | 5/2002 | Van Der Pol et al. | 701/37 |
| 6,405,132 B1 | * | 6/2002 | Breed et al. | 701/301 |
| 2002/0103622 A1 | * | 8/2002 | Burge | 702/183 |
| 2002/0188392 A1 | * | 12/2002 | Breed et al. | 701/45 |
| 2002/0198632 A1 | * | 12/2002 | Breed et al. | 701/1 |

OTHER PUBLICATIONS

Frimberger et al., Influences of parameters at vehicle rollover, 2000, Internet, pp. 1–8.*

Garrott et al., The rollover propensity of fifteen–passengers vans, 2001, Internet, pp. 1–12.*

* cited by examiner

Primary Examiner—William A. Cuchlinski, Jr.
Assistant Examiner—Marc McDieunel
(74) Attorney, Agent, or Firm—Kenyon & Kenyon

(57) ABSTRACT

A method for classifying a rollover event of a vehicle is used to classify a rollover event on the basis of a rotational angle and a rotation rate of the vehicle and to transmit an emergency call as a function of the classification. The rollover event itself is recognized on the basis of a momentum or energy criterion. The rotation rate is summed to determine the rotational angle, the summed rotation rate as well as the rotation rate being compared to classification boundaries as a pair of values in order to perform a classification. The emergency call is made only if the restraint devices have been deployed.

9 Claims, 3 Drawing Sheets

METHOD FOR CLASSIFYING A ROLLOVER EVENT OF A VEHICLE

BACKGROUND INFORMATION

The deployment of restraint devices in a motor vehicle appropriate to an accident is known. An emergency call may be transmitted. The reduction of speed during an accident may be used as a criterion for the severity of an accident.

German Patent No. 199 45 614 describes a method for transmitting data between a control unit for restraining devices and sensors, where it is possible for the control unit to flexibly and temporally access the measuring data of individual sensors. In this context, a control unit transmits a request telegram to the sensors, each sensor being able to deduce from the comparison of the request telegram with its own address, whether or not, and in which time window, it should transmit its measuring data to the control unit. German Published Patent Application No. 197 48 992 describes a device for emitting emergency signals from a motor vehicle, the device having a microcomputer, which dispatches an emergency call as a function of sensor signals. In this case, it is possible to consider the severity of the crash. In German Published Patent Application No. 199 05 193, a method for triggering a safety device in a motor vehicle in the case of a rollover is described, the triggering decision being made as a function of rotation-rate data and inclination angles of the vehicle.

SUMMARY OF THE INVENTION

The method of the present invention for classifying a rollover event of a motor vehicle has the advantage that it is possible to determine the severity of an accident in a simple manner even in a rollover event, an emergency call then being transmitted as a function of this recognized accident severity. A prerequisite for this is that restraint devices are used. Thus, the emergency call contains the accident severity as its content. The rotation rate, which may be detected with a rotation-rate sensor, is one of the parameters to be analyzed, because the accident severity increases in a rollover event as the rotation rate increases since this indicates a very rapid rollover event. However, the rotation rate and the rotational angle, which is derived from the summed rotation rate, ultimately determine the classification of the rollover event as a pair of values. The rotation rate is suitable to record rapid events in particular, while the rotational angle characterizes the rollover event per se. Both parameters are thus used for classification. From this are then derived the pairs of values which result in a classification of the rollover event in a diagram. The classification takes place, however, only if a deployment decision for the restraint devices has been made.

It is advantageous in particular that the rollover event is recognized on the basis of the impact energy or impact momentum. In the case of impact energy, the kinetic energy, which characterizes the rotation rate and the potential energy, which characterizes the rollover event per se in particular, is taken into account. Moreover, it is of advantage that the summed rotation rate is compared with threshold values in order to finally perform the classification. In a rotation rates-rotational angle diagram, the class areas for the pairs of values are then defined by establishing zone boundaries corresponding to the threshold values. Thus, if a pair of values lies in such a class area, it is then classified according to that class area.

Moreover, it is advantageous that a device to implement the method is present, which has a rotation rate sensor to detect the rotation rates, a processor to analyze the rotation rates and to sum the rotation rates, a transmitter to transmit the emergency call, an acceleration sensor to determine an impact energy and a memory to temporarily store interim results and to call specified threshold values.

DETAILED DESCRIPTION

In order to deploy restraint devices for vehicle passengers in a rollover as appropriate to the situation, it is necessary to compare a sensor signal or values derived from it with a deployment threshold. As a function of the severity of the accident, an emergency call is then transmitted. Accordingly, this emergency call has a content which is determined by the severity of the accident.

According to the present invention, therefore, a rollover event is first recognized, appropriate restraint devices are deployed and this rollover event is then classified using a rotational angle and a rotation rate of the vehicle in order to transmit an emergency call with appropriate content as a function of this classification. In doing so, the pair of values derived from the rotation rate and rotational angle are always considered. The rollover event, which is defined by the pair of values, is classified as a function of the location of the pair of values in a rotation rates-rotational angle diagram. As a function of time, the rollover event is defined by a sequence of pairs of values which run as a function through the rotation rates-rotational angle diagram. The rollover event will then pass through several classifications over time as appropriate.

Classes 0, 1, 2 and 3 are considered here as an example, a more precise subdivision being possible. Class 0 describes the case in which no rollover event occurs. Class 1 defines an event with a low rotation rate, however, with a high rotational angle range. Class 2 determines a rollover event with a high rotation rate and a small rotational angle, while Class 3 describes a rollover event with a high rotation rate and a large rotational angle. The classification with regard to the setting of values is based on empirical values and/or simulations of rollover events.

Figure 1:
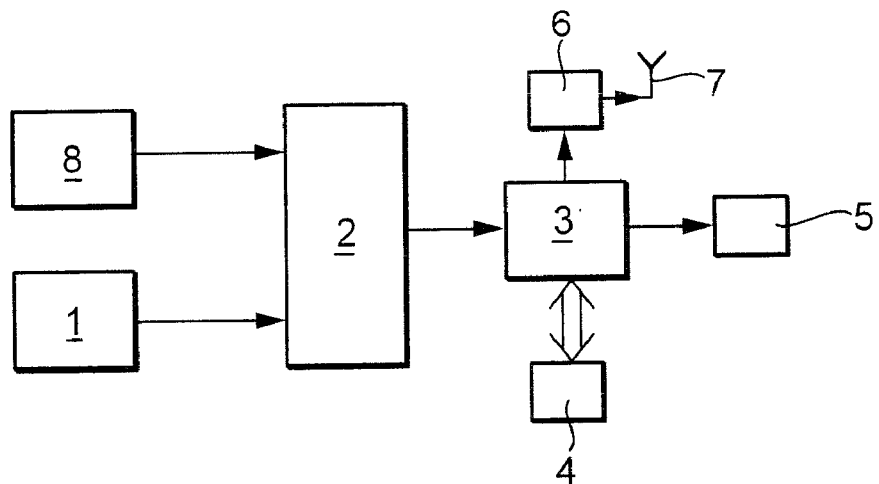
FIG. 1 shows a block diagram of the device of the present invention.

FIG. 1 shows a block diagram of a device of the present invention, which in this case is a control unit for restraint devices. A rotation rate sensor 1 is connected to a first input of a signal processing unit 2. An acceleration sensor 8 is connected to a second input of the signal processing unit 2. A data output of signal processing unit 2 is connected to a data input of a processor 3. A first data output of processor 3 is connected to restraint devices 5. A second data output of processor 3 is connected to a transmitter 6 which is in turn connected to an antenna 7. Processor 3 is connected to a memory 4 via a data input/output.

Rotation rate sensor 1, in the form of a micromechanical sensor in this case, detects the rotation rate of the vehicle and transfers a corresponding electrical signal to signal processing unit 2, which amplifies, filters and digitizes it. Signal processing unit 2 also amplifies, filters and digitizes the acceleration signal from acceleration sensor 8. Parts of signal processing unit 2 may be distributed to sensors 1 and 8 and to processor 3; for example, the signal amplification and the filtering are assigned to sensors 1 and 8 while the digitization takes place in processor 3.

Processor 3 compares the sensor signals as pairs of values of rotation rates and angles with preset threshold values or class boundaries to carry out appropriate actions if these threshold values or class boundaries are exceeded. These actions include in particular the deployment of restraint devices 5. Using the threshold values or class boundaries stored in memory 4, processor 3 may also perform a classification of a possible rollover event after recognition of the rollover event as a function of time. This classification is only performed if restraint devices 5 are deployed. In doing so, processor 3 sums the rotation rate signals as well as the acceleration signals to obtain integrated rotation rate signals, i.e., angles, or acceleration signals, i.e., speeds. Consequently, pairs of values of rotation rates and rotational angles are present in order to perform a classification of the rollover event, the classification prompting appropriate actions such as the deployment of restraint devices. In addition, memory 4 is used for the intermediate storage of interim results. Processor 3 may be connected to sensors 1 and 8 via a sensor bus.

If processor 3 recognizes the presence of a rollover event and a comparison with the deployment threshold brings about deployment of restraint devices 5, processor 3 transfers appropriate signals to restraint devices 5 to properly fire those restraint devices 5. In this case, restraint devices 5 are airbags in particular. Restraint devices 5 are then used consistent with a passenger classification.

The classification of the rollover event specifies the accident severity which determines the content of the emergency call. Processor 3 then transfers an appropriate message to transmitter 6, the message being stored in memory 4 and f then transmitted via antenna 7. Transmitter 1 and antenna 7 may be, for example, a mobile wireless module which is integrated in the vehicle.

Figure 2:
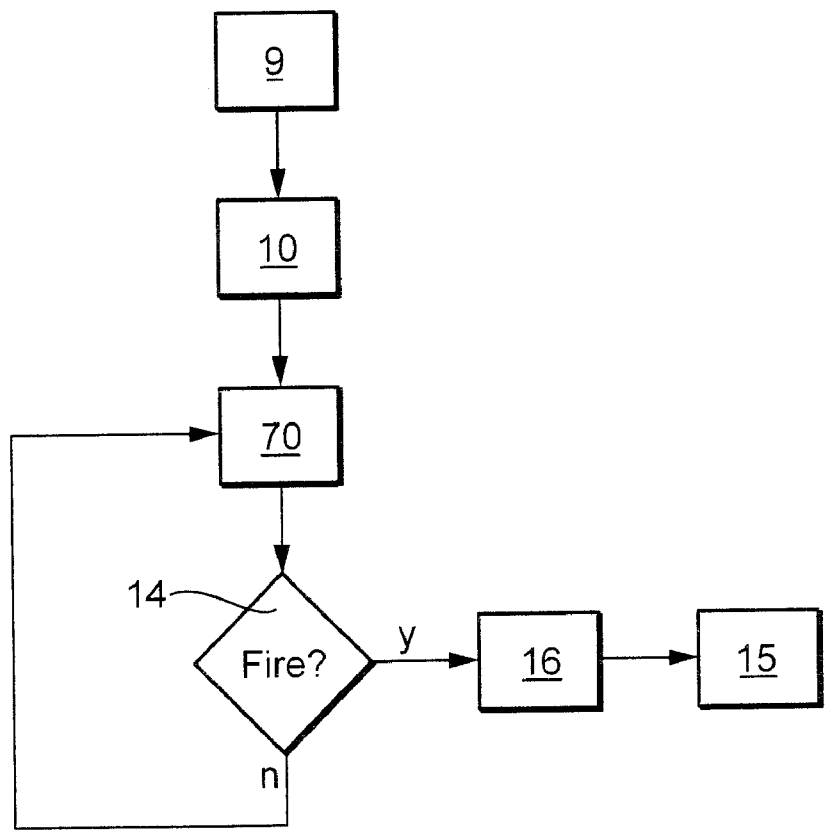
FIG. 2 shows a flowchart of the method of the present invention.

The method of the present invention for classifying a rollover event of a vehicle is shown as a flowchart in FIG. 2. In procedure step 9, the sensor signals from rotation rate sensor 1 are detected. In procedure step 10, the rotation rate is summed to determine a rotational angle at the corresponding time. In procedure step 70, a rollover algorithm is calculated and the deployment decision for restraint devices 5 is made. In doing so, signals from rotation rate sensor 1 are detected and are supplied to the corresponding deployment algorithm for restraint devices 5 for a rollover recognition. The integrated rotation rate signal may also be considered if appropriate. Instead of the rotation rate signals, the acceleration may also be used. A rollover event may also be recognized as a function of acceleration if more than one acceleration sensor is present. In a refinement, it is also possible that a classification and an emergency call is transmitted with a deployment of restraint devices 5 due to a collision with a rollover event, which itself would not result in a deployment of restraint devices 5.

In procedure step 14, the rotation rate signal is compared with a deployment threshold to determine if restraint devices 5 must be deployed. If this is not the case, then the procedure goes back to step 70. The deployment threshold may also be adapted to the integrated rotation rate signal.

If restraint devices 5 are to be deployed, then a corresponding deployment of restraint devices 5 is performed in procedure step 16 according to a passenger classification.

In procedure step 15, the classification then takes place using the pair of rotation rate signal and rotational angle signal values in order to transmit an appropriate emergency call.

Figure 3:
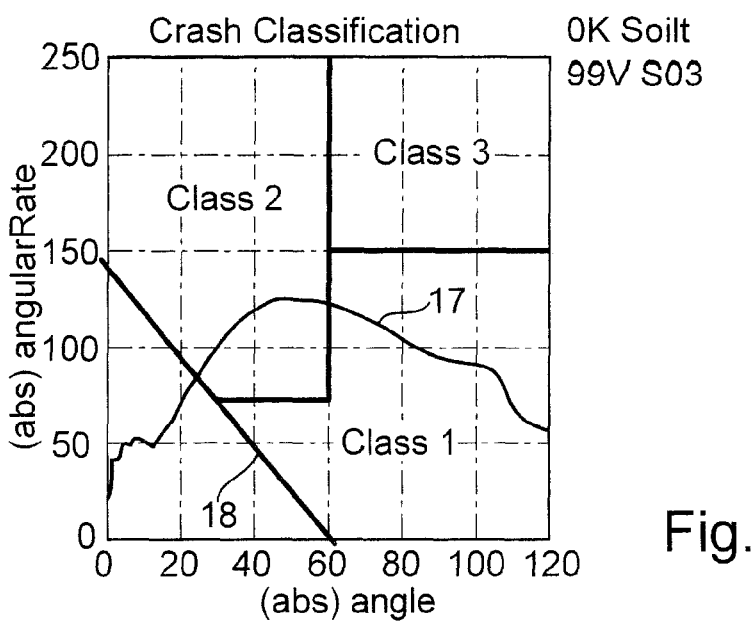
FIG. 3 shows a rollover event classification.

The class boundaries shown in FIG. 3 are associated with physical characteristics of the rollover event. Curve 17 describes the sequence of the pairs of values which runs through several classes as a function of time. A crossing of curve 18 by curve 17 brings about a deployment of restraint devices 5. Curve 18 is consequently a deployment threshold.

Class 0 or no classification indicates that no activation of restraint devices 5 is necessary. Class 1 is addressed by very slow rollover events. In this case, only low rotation rates and accordingly low rotation speeds occur. Class 2 shows the initial phase of the rotation, i.e., angles smaller than 60°, which in the further course are below a threshold of 150°/s. Class 3 defines rollover events with high rotation rates and large rotational angles.

The calculation of classes is performed during the entire rollover crash from the time of deployment. The pairs of values of rotational angle and rotation rate are compared with the class boundaries from FIG. 3 in real time.

The result of the comparison is only able to correct the class number upwards to higher classes. The signal is monitored until the rotation rate is zero or the rotational angle reaches 120°. Simultaneously, an emergency call is transmitted as a function of the classification, transmitter 6 with antenna 7 being used for this purpose. Since restraint devices 5 are deployed, an emergency call is always transmitted. However, the classification and accordingly the accident severity determine the content of the emergency call.

Figure 5:
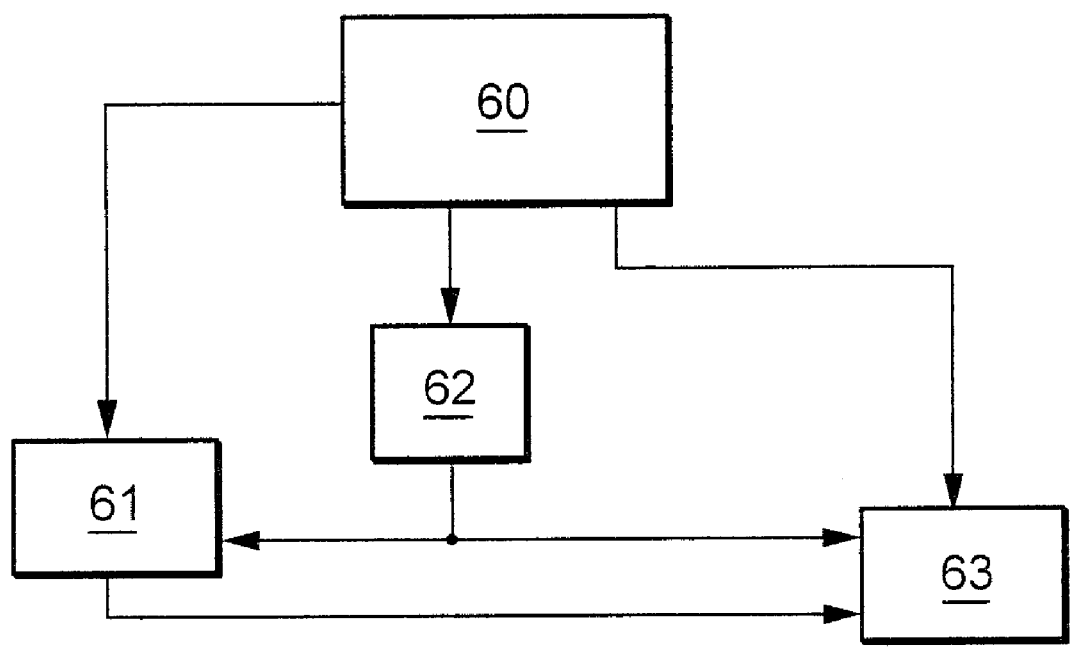
FIG. 5 shows an additional flowchart of the method according to the present invention.

An additional flowchart which illustrates the method of the present invention is shown in FIG. 5. The rotation rate is detected in procedure step 60. The rotation rate is used as a parameter in procedure step 61 for a rollover algorithm. In addition, the rotation rate is integrated in procedure step 62 to determine the rotational angle. Moreover, the rotation rate is used in procedure step 63 to classify rollover events.

Moreover, the angle determined in procedure step 62 is included in rollover algorithm 61 as a parameter. In addition, the angle is used as a parameter in classification of the rollover event.

If it is decided in procedure step 61 that restraint devices 5 must be deployed due to a rollover event, then the classification of the rollover event is started in procedure step 63. The deployment decision acts as a trigger for the classification. The pair of values composed of the rotation rate and rotational angle are then used for this purpose.

A rotation rates-rotational angle diagram is shown in FIG. 3, the rotation rate and the rotational angle being indicated as absolute values. Curve 17 describes a curve of the angles and of the rotation rates measured as a function of time, the curve being derived from the pairs of values in a rollover event. By default, the diagram is divided into four classes by class boundaries. The first class, also named Class 0 which, starting from the origin is limited by the threshold value (curve 18) from 149° to 60°, includes the cases in which a non-deployment event is present, i.e., the rollover event does not occur. Class 1 describes rollover events which occur with a relatively low rotation rate and will thus result in less severe injuries. Class 2 includes rollover events that occur with a high rotation rate and Class 3 events are those which occur on average with an even higher rotation rate and have a greater rotational angle than those of Class 2. Starting from an initial threshold value at approximately 30, 70, a threshold value leads to point 60, 70, which then changes into a threshold value ranging from 60, 70 to 60, 250. An additional threshold value leads from point 60, 150 to 120, 150. Curve 17, which is based on experimental data, shows a typical progression of the rotation rate as a function of rotational angle.

Figure 4:
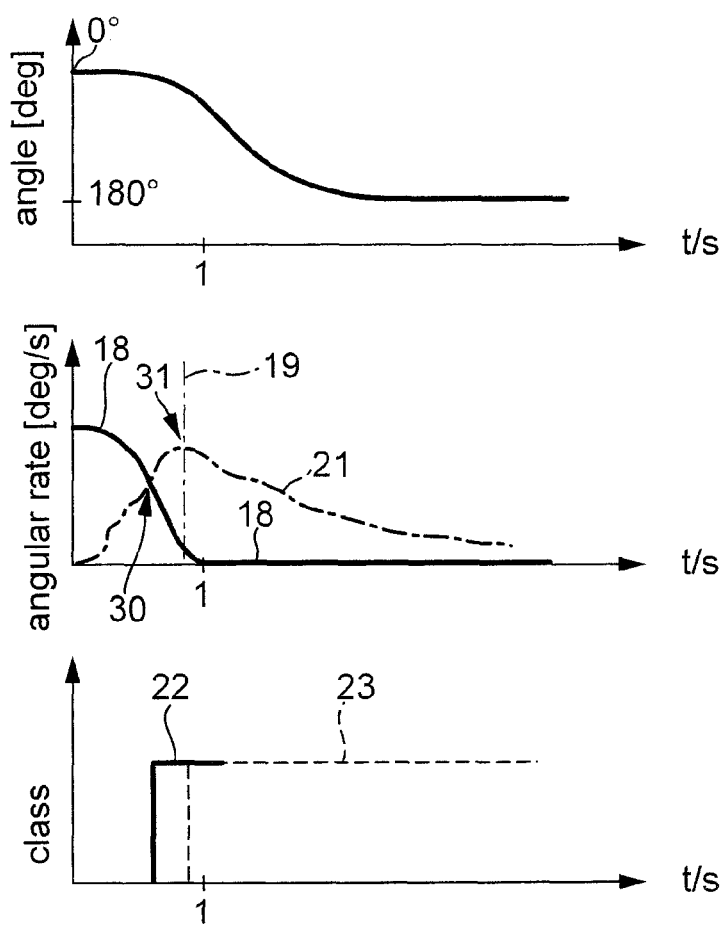
FIG. 4 shows a classification of the accident severity in a rollover.

An example of the classification of the accident severity in an overturn is shown in FIG. 4. The top diagram shows the angle as a function of time. In the center diagram, the rotation rate is plotted as a function of time. In addition, classification boundaries and deployment criteria are also included in the drawing. The bottom diagram shows the recognized deployment as a class/time diagram. Curve 18 describes the dynamic deployment threshold which is obtained from the angle. It is also shown in FIG. 3.

The summed angle, which is determined from the rotation rate signal by summing, goes roughly from 0° to −180°, resulting in the occurrence of a rollover that has caused the vehicle to come to rest on its roof. In the center diagram, the rotation rates/time diagram, rotation rate 21 is shown as a function which intersects curve 18 at roughly point 0.780. The first point, which is indicated here by arrow 30, is recognized as a criterion for a rollover since the preset energy criterion is exceeded in this case. Corresponding to this deployment at an energy criterion which takes place before the momentum criterion, the momentum is set at 0.7 seconds in the bottom diagram in order to carry out the classification. The classification is only dependent on the position of the signal in FIG. 3 and is performed until the end of the crash.

Curve 19 describes the deployment threshold as a function of the angle, rotation rate 18 also being compared with the rotational angle. Both criteria energy 18 and momentum 19 are optionally used by the rollover algorithm as a deployment criterion. In this case, the changeover via the acceleration signals takes place in z-direction. The first signal evaluation is made by the rollover algorithm in order to make a deployment decision. The second signal evaluation is then made by the classification algorithm.

In the event of an accident, restraint devices 5 are therefore deployed first. The classification algorithm is then started. The classes indicate the accident severity while the deployment criterion is responsible for the protection of the passengers. It may thus be the case that the deployment criterion is in Class 0 and the accident severity is in Class 1.

What is claimed is:

1. A method of classifying a rollover event of a vehicle, the method comprising:

deploying restraint devices as a function of the rollover event;

classifying the rollover event with respect to a crash severity as a function of a rotational angle and a rotation rate of the vehicle; and transmitting an emergency call as a function of the classification.

2. The method according to claim 1, further comprising recognizing the rollover event as a function of one of an impact energy and an impact momentum in the event of a collision of the vehicle.

3. The method according to claim 1, further comprising:

summing the rotation rate; and comparing, on the one hand, the summed rotation rate and the rotation rate as a pair of values with, on the other hand, classification boundaries, in order to perform the classification.

4. The method according to claim 3, wherein the classification boundaries define four classes.

5. A device comprising:

means for recognizing a rollover event of a vehicle;

a rotation-rate sensor;

a transmitter; and a processor coupled to the rotation-rate sensor, the processor classifying the rollover event with respect to a crash severity as a function of a rotation rate and a rotational angle of the vehicle, the processor being adapted to be connected (a) to the transmitter to transmit an emergency call as a function of the classification of the rollover event and (b) to restraint devices of the vehicle.

6. The device according to claim 5, wherein the means for recognizing includes at least one acceleration sensor for recognizing the rollover event as a function of one of an impact energy and an impact momentum in the event of a collision of the vehicle.

7. The device according to claim 5, further comprising a memory for storing classification boundaries for a rotational rate and a summed rotational rate.

8. A method comprising:

deploying restraint devices as a function of a rollover event;

determining a crash severity of the rollover event as a function of a rotational angle and a rotation rate of the vehicle; and transmitting the crash severity in an emergency call.

9. A device comprising:

means for recognizing a rollover event of a vehicle;

a rotation-rate sensor;

a transmitter; and a processor coupled to the rotation-rate sensor, the processor determining a crash severity of the rollover event as a function of a rotation rate and a summation of the rotation rate of the vehicle, the processor being adapted to be connected (a) to the transmitter to transmit the crash severity in an emergency call and (b) to restraint devices of the vehicle.

* * * * *